United States Patent
Misaras

(10) Patent No.: US 7,201,508 B2
(45) Date of Patent: Apr. 10, 2007

(54) BACKLIGHTING METHOD FOR AN AUTOMOTIVE TRIM PANEL

(75) Inventor: David M. Misaras, Rochester Hills, MI (US)

(73) Assignee: Collins & Aikman Products, Co., Southfield, MI (US)

( * ) Notice: Subject to any disclaimer, the term of this patent is extended or adjusted under 35 U.S.C. 154(b) by 280 days.

(21) Appl. No.: 10/622,251

(22) Filed: Jul. 18, 2003

(65) Prior Publication Data

US 2004/0017687 A1 Jan. 29, 2004

Related U.S. Application Data

(62) Division of application No. 09/773,840, filed on Jan. 31, 2001, now Pat. No. 6,652,128.

(51) Int. Cl.
*G09F 13/00* (2006.01)
(52) U.S. Cl. .................. 362/551; 362/249; 362/29; 362/153
(58) Field of Classification Search ................ 362/489, 362/26, 23, 551–555, 583, 471, 482, 493, 362/545, 85, 259
See application file for complete search history.

(56) References Cited

U.S. PATENT DOCUMENTS

| | | | |
|---|---|---|---|
| 2,542,930 A | 2/1951 | Lancaster | 177/329 |
| 3,053,337 A | 9/1962 | Prohaska et al. | 180/90 |
| 3,599,596 A | 8/1971 | Remus et al. | 116/114 |
| 3,786,246 A | 1/1974 | Johnson et al. | 240/6.4 R |
| 4,206,966 A | 6/1980 | Tyson et al. | 350/19 |
| 4,276,561 A | 6/1981 | Friedman | 358/78 |
| 4,334,867 A | 6/1982 | Friedman | 434/145 |
| 4,443,832 A | 4/1984 | Kanamori et al. | 362/84 |
| 4,443,835 A | 4/1984 | Brautigam et al. | 362/300 |
| 4,598,657 A | 7/1986 | Makabe et al. | 112/275 |
| 4,935,850 A | 6/1990 | Smith, Jr. | 362/27 |
| 5,029,045 A | 7/1991 | Sanai et al. | 362/26 |
| 5,050,046 A | 9/1991 | Tada | 362/26 |
| 5,061,872 A | 10/1991 | Kulka | 313/111 |
| 5,095,409 A | 3/1992 | Dematteo et al. | 362/23 |
| 5,217,244 A | 6/1993 | Bauer | 280/728 |
| 5,226,105 A | 7/1993 | Myers | 385/147 |
| 5,287,251 A | 2/1994 | Kato | 362/85 |
| 5,294,815 A | 3/1994 | Iechi | 257/95 |
| 5,362,673 A | 11/1994 | Iechi | 437/127 |
| 5,375,875 A | 12/1994 | DiSalvo et al. | 280/728 B |
| 5,432,684 A | 7/1995 | Fye et al. | 362/30 |
| 5,438,484 A | 8/1995 | Kanda et al. | 362/31 |
| 5,516,143 A | 5/1996 | Lang et al. | 280/728.3 |

(Continued)

*Primary Examiner*—Sandra O'Shea
*Assistant Examiner*—Anabel Ton
(74) *Attorney, Agent, or Firm*—Grossman, Tucker, Perreault & Pfleger, PLLC

(57) ABSTRACT

The present invention relates to an apparatus and method of perforating the cover layer or soft skin of an automotive trim panel such as an instrument panel with a laser to allow light to bleed through the perforations. The light source would preferably be a low heat generating or "cool" type source such as an LED. The light source would be attached to a suitable substrate or incorporated in to a flexible printed circuit and coupled to the vehicle electrical system. This method would enable fill switch integration to a trim panel and provide a seamless styling opportunity regarding the electrical controls. This method would help reduce cost and weight, improve quality, and promote new seamless styling theme.

11 Claims, 5 Drawing Sheets

U.S. PATENT DOCUMENTS

| | | | |
|---|---|---|---|
| 5,555,160 A | 9/1996 | Tawara et al. | 362/31 |
| 5,590,945 A | 1/1997 | Simms | 362/31 |
| 5,597,200 A | 1/1997 | Gregory et al. | 297/180.13 |
| 5,604,407 A | 2/1997 | Andres et al. | 315/77 |
| 5,632,914 A | 5/1997 | Hagenow et al. | 219/121.71 |
| 5,641,221 A | 6/1997 | Schindele et al. | 362/80 |
| 5,647,658 A * | 7/1997 | Ziadi | 362/471 |
| 5,664,873 A | 9/1997 | Kanda et al. | 362/97 |
| 5,673,995 A | 10/1997 | Segaud | 362/83.3 |
| 5,734,137 A | 3/1998 | Wakefield | 200/5 A |
| 5,744,776 A | 4/1998 | Bauer | 219/121.7 |
| 5,772,314 A | 6/1998 | Brumer | 362/360 |
| 5,775,779 A * | 7/1998 | Abu-Isa et al. | 297/452.56 |
| 5,806,880 A | 9/1998 | Gray | 280/728.3 |
| 5,824,738 A | 10/1998 | Humphrey et al. | 524/715 |
| 5,842,769 A | 12/1998 | Muller et al. | 361/61 |
| 5,917,165 A * | 6/1999 | Platt et al. | 200/600 |
| 5,926,265 A | 7/1999 | Task et al. | 356/229 |
| 5,961,143 A | 10/1999 | Hlywka et al. | 280/728.3 |
| 5,971,761 A * | 10/1999 | Tillman, Sr. | 434/81 |
| 5,992,876 A | 11/1999 | Gray | 280/728.3 |
| 6,050,715 A | 4/2000 | Hunger | 362/576 |
| 6,158,867 A | 12/2000 | Parker et al. | 362/29 |
| 6,382,821 B1 | 5/2002 | Heyer et al. | 362/509 |
| 6,420,452 B1 * | 7/2002 | Gunatillake et al. | 523/105 |
| 6,483,048 B1 | 11/2002 | Bontrager et al. | 200/5 R |
| 6,652,128 B2 * | 11/2003 | Misaras | 362/488 |
| 6,672,749 B2 * | 1/2004 | Nicholls et al. | 362/559 |
| 6,755,561 B2 * | 6/2004 | Kluser | 362/551 |
| 6,971,760 B2 * | 12/2005 | Archer et al. | 362/101 |

* cited by examiner

BACKLIGHTING METHOD FOR AN AUTOMOTIVE TRIM PANEL

CROSS-REFERENCE TO RELATED APPLICATIONS

This application is a divisional application of U.S. application Ser. No. 09/773,840, filed Jan. 31, 2001, now U.S. Pat. No. 6,652,128.

FIELD OF THE INVENTION

The present invention relates to an apparatus and method of back lighting an automotive trim panel, particularly an instrument panel, by perforating the cover layer with a laser and locating a light source there behind. The perforations allowing light from a low heat generating or "cool" type light source such as an LED to bleed through the perforations so as to be seen by the vehicle occupant.

BACKGROUND OF THE INVENTION

Currently, automotive interior back lighting requires a bezel or other plastic piece and a light source. The bezel is attached to a trim panel such as an instrument panel, console, or door panel. The light source is typically used to backlight a switch or knob. The bezel mounts in an opening in the trim panel and a portion of the bezel rests on top of the trim panel. The portion that rests on top of the trim panel can visually detract from the clean styling of the trim panel.

In certain automotive interior applications, back lighting is used to convey messages to the vehicle occupants or allow the occupants to locate knobs and/or switches at night. Backlighting of an object requires a multitude of parts to be assembled in order to direct the light from the source to the proper location. U.S. Pat. No. 5,842,769 entitled "Automotive Apparatus and Method Using Bulb Socket Retention of Components" relates generally to an apparatus and method for retaining lamp components with a bulb socket and specifically to an automotive back-lit switch using a bulb socket to retain a lamp reflector. Many of these components are custom designed for the particular application. These assemblies are expensive to fabricate, stock, and assemble.

Several U.S. patents disclose the use of a laser to generate extremely small holes in an automotive instrument panel around an air bag opening. U.S. Pat. No. 5,632,914 entitled "Motor Vehicle Air Bag Cover having a Skin with a Virtually Invisible Tear Seam Formed by Miniature Holes". The '914 patent discloses forming a tear seam, above an air bag door in the thin elastic plastic skin of a vehicle instrument panel. The tear seam being formed with a plurality of extremely small (less than 0.0005") laser machined holes. These holes are not observable to a person of normal vision when viewed from the passenger compartment. U.S. Pat. No. 5,744,776 entitled "Apparatus and for Laser Preweakening an Automotive Trim Cover for an Air Bag Deployment Opening". The '776 patent discloses a process for preweakening the inside of an automotive trim piece cover layer of various constructions by use of a laser beam so as to enable formation of an air bag deployment opening in the trim piece formed at the time the air bag deploys. Although these references teach forming openings in an vehicle instrument panel with a laser, they fail to teach locating a light source behind the openings and using the formed openings as illumination light pipes.

BRIEF SUMMARY OF THE INVENTION

An automotive trim panel, comprising a cover layer having a front surface and a rear surface, the cover layer comprising a plurality of openings extending from the front surface to the rear surface, and a light source to light through the openings from the rear surface to the front surface.

In alternative embodiment the present invention relates to an automotive trim panel, comprising a light transmissive layer having a first side and a second side, a light blocking layer covering at least a portion of the transmissive layer, a light source located on the first side of the light transmissive layer, the light blocking layer allowing light to travel from the light source through the transmissive layer to the second side only where the light blocking layer is not present.

In another alternative embodiment the present invention relates to an automotive trim panel, comprising a light transmissive cover layer having a front surface and rear surface, a light pipe having a first end and a second end, and a light source, wherein said first end of said light pipe is positioned adjacent to said rear surface of the cover layer and said second end is positioned adjacent said light source.

In a further alternative embodiment the present invention relates to a method of back lighting an automotive trim panel, comprising forming a plurality of openings in a cover layer of the-trim panel and positioning a light source with the openings to allow light to exit through the openings and enter the vehicle compartment.

The above and other objects, feature, and advantages of the present invention will be apparent in the following detailed description thereof when read in conjunction with the appended drawings wherein the same reference numerals denote the same or similar parts throughout the several views.

DETAILED DESCRIPTION OF THE PREFERRED EMBODIMENTS

Figure 1:
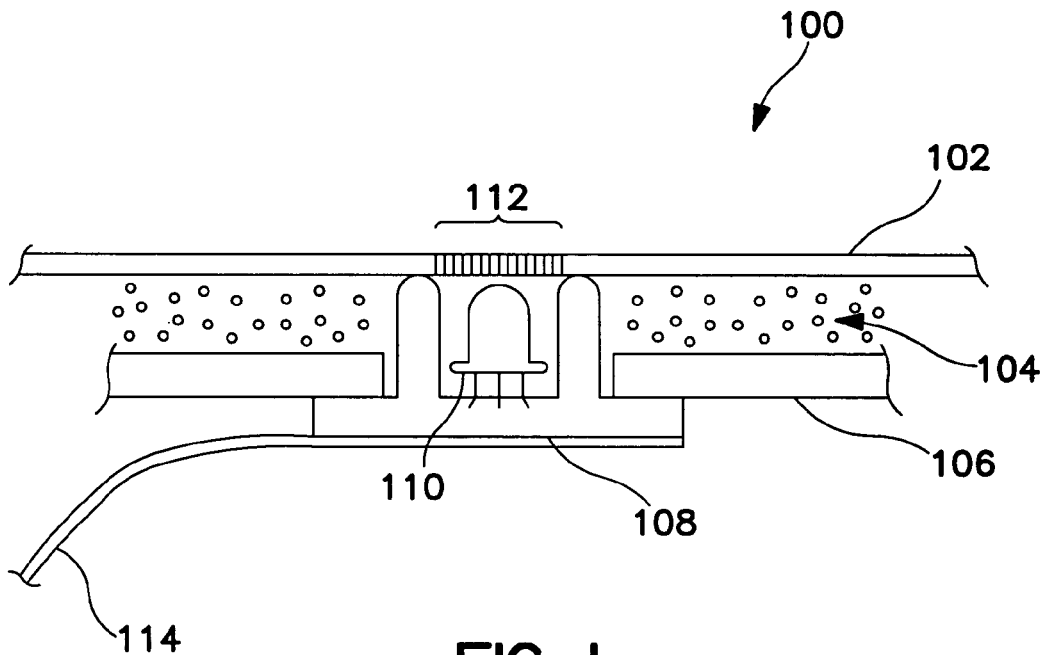
FIG. 1 is a profile view of a first embodiment backlit automotive trim panel in accordance with the present invention.

Referring to the drawings, there is illustrated generally at 100, a profile view of a first embodiment backlit automotive trim panel in accordance with the present invention. An automotive trim panel 100 may include, but is not limited to, an automotive instrument panel, door panels, headliners, and consoles. The trim panel 100 has a cover layer 102, a cushion/foam layer 104, and a retainer layer 106. The cover layer 102 may be made of leather, vinyl (PVC), polyurethane, a textile such as cloth, or other pliable materials. By the term pliable it is meant that the cover layer is flexible at room temperature in the sense that it will deflect and will be capable of recovery when used as a cover layer in an automotive trim panel application. More specifically, the surface of the cover layer has a surface that will deflect upon contact pressure typical within the automobile environment. In that regard, an alternative definition of the term pliable, therefore, would apply to those polymer materials which have a glass transition temperature (Tg) at or below room temperature and which have a majority (50% or greater) of amorphous morphology, such that at room temperature, they will flex with recovery so that they can be used as a trim panel cover layer. In the sense of mechanical properties, a pliable cover layer would include polymer material that would have one or more of the following properties: 1. Elongation over 150%, preferably over 200%, with elongations up to 400%, including all values therebetween; 2. Tensile Strengths as low as 750–1000 psi, preferably below 5000 psi, an upward value of preferably 7500 psi, and all values therebetween; 3 Shore Hardness values between 60–100A, preferably between 70–90, and all values therebetween.

One particularly preferred trim panel cover layer suitable herein is the light stable aliphatic polyurethane elastomer described in U.S. Pat. No. 5,824,738, whose teachings are incorporated herein by reference.

The retainer layer may be used to secure the trim panel 100 to a vehicle structure. Secured to the retainer layer is a housing 108 for holding a light source 110. The housing 108 may be secured to the retainer layer 106 using adhesive, tape, or other suitable attachment methods.

The light source may be a light emitting diode (LED) or other low heat generating or "cool" type light source. Broadly speaking, the light source is any source which does not, e.g., due to heat build-up, adversely effect the cover layer 102 by some form of melting. The housing 108 may include conductive traces (not shown) to couple the light source 110 to vehicle wiring 114. The vehicle wiring 114 may provide the light source 110 with power. Alternatively, the light source can be incorporated into a flexible printed circuit board which can be secured to the retainer layer. The light source can be any color and it can be controlled at any intensity or duty cycle. Alternatively, filters of different colors can be used to give the light some color.

The light source 110 may be aligned with openings 112 formed in the cover layer 102. The openings in the cover layer may be formed using a laser or other suitable cutting means. The size and quantity of the openings and the pattern of the openings will be described below. The interior surface of the housing 108 may be reflective to aid in increasing the amount of light exiting through the openings 112.

Figure 2:
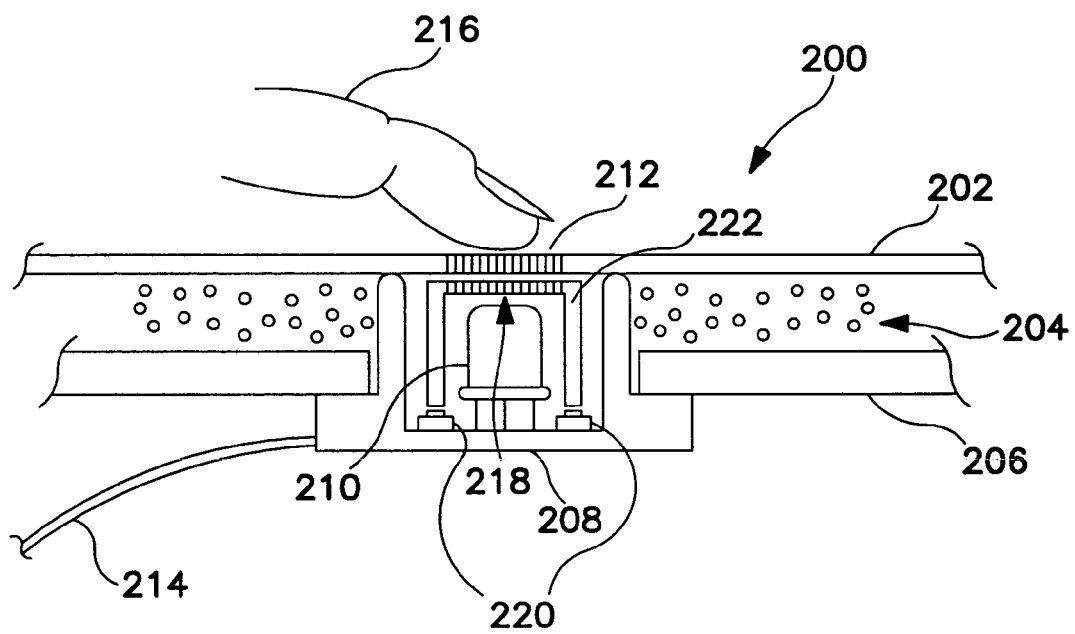
FIG. 2 is a profile view of a second embodiment automotive trim panel with a backlit switch assembly made in accordance with the present invention.

FIG. 2 illustrates generally at 200, a profile view of an automotive trim panel with a backlit switch in accordance with the present invention. The trim panel 200 has a cover layer 202, a cushion/foam layer 204, and a retainer layer 206. Secured to the retainer layer 206 is a housing 208 for holding a light source 210 and switch or switches 220. The housing 208 may be secured to the retainer layer 206 using adhesive, tape, or other suitable attachment methods. The housing 208 may include conductive traces (not shown) to couple the light source 210 and switch/es 220 to vehicle wiring 214. The vehicle wiring 214 may provide the light source 210 with power. The light source 210 can be any color and it can be controlled at any intensity or duty cycle. The light source 210 may be aligned with openings 212 formed in the cover layer 202. The openings in the cover layer 202 may be formed using a laser or other suitable cutting means.

An actuator 222 may be moveable between a first position and a second position. In the first position, the actuator 222 is spaced from the switch/es 220 and in the second position the actuator actuates the switch/es 220. The actuation of the switch/es 220 may be detected by a controller coupled to the vehicle wiring 214. The actuator 222 may be moved from the first position to the second position by an occupant of the vehicle 216 exerting a force on the cover layer 202. The actuator may have a series of openings 218. The openings would also allow light to travel from the light source 210 towards the vehicle occupant. Alternatively, the actuator may be molded out of a transparent or translucent material without openings.

The integration of switches in a trim panel is described in copending U.S. patent application Ser. Nos. 09/625,113 and 09/624,117 both filed Jul. 25, 2000 and entitled "Automotive Trim Panel with Electrical Wiring Incorporated therein". The '113 and the '117 applications are herein incorporated by reference in their entirety.

Figure 3A:
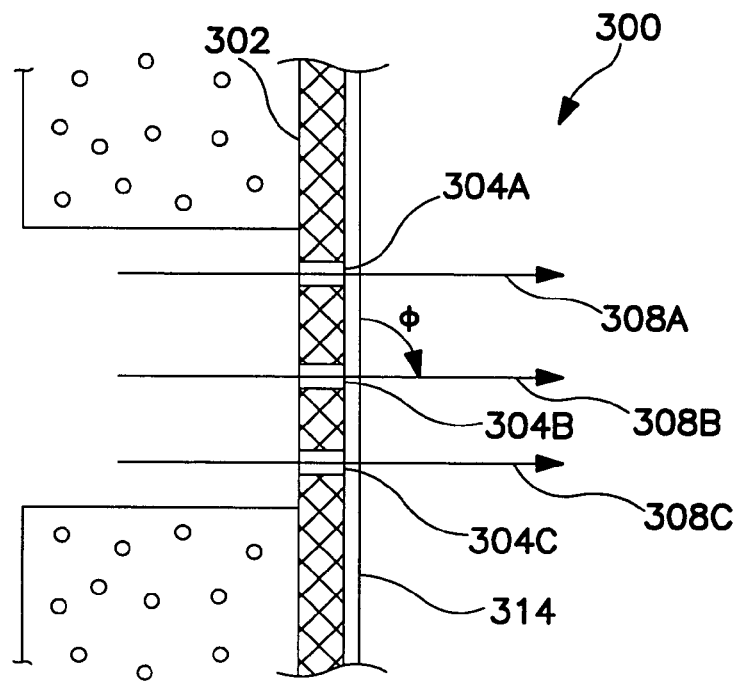
FIG. 3A is a profile view of a third embodiment backlit automotive trim panel in accordance with the present invention.

FIG. 3A shows light rays 308A–C emanating from a light source (not shown) located a spaced distance from a cover layer 302. The light rays 308A–C enter the vehicle compartment through a series of openings 304A–C, preferably formed with a laser. The openings 304A–C are formed in the cover layer at a first angle ø to the front surface of the trim panel 300. In one preferred embodiment, the angle is 90°.

A viewing angle of the light rays by the vehicle occupant is dependent on the size, spacing, and shape of the openings 304A–C and the distance from the light source to the openings. The emanating light may only be visible by an occupant sitting directly in line with the openings 304A–C. This directional aspect allows for an indicator that can only be seen by the occupant directly in front of the opening, for example the driver and not the passenger. Alternatively, when desired, the light may be visible to both the driver and the passenger, and such variability is another aspect of the present invention.

An optional transparent or translucent layer 314 may be applied over the opening 304A–C to prevent the openings from becoming clogged possibly with dust. The layer 314 can be tinted to match other automotive interior components and lighting requirements. Further, the layer may also act as a filter to reduce "hot spots" of light and create more of a "glowing" appearance. The transparent or translucent layer 314 may be a coating layer, for example paint, and may seal the holes or fill the holes and provide a smooth surface. In such regard, the paint may comprise a clear-coat paint which has a surface tension suitable to skin-over or fill the holes, as noted above. In such regard, the coating layer may comprise a thermoplastic or thermoset resin. Preferred resins include resins such as poly(methylmethacrylate), polycarbonate, polyurethane and or epoxy resins.

The openings 304A–C are shown having a uniform/constant cross sectional area through the cover layer. Alternatively, the cross sectional area can be varied, i.e. the cross sectional area is larger on the rear surface of the cover than on the front surface.

Figure 3B:
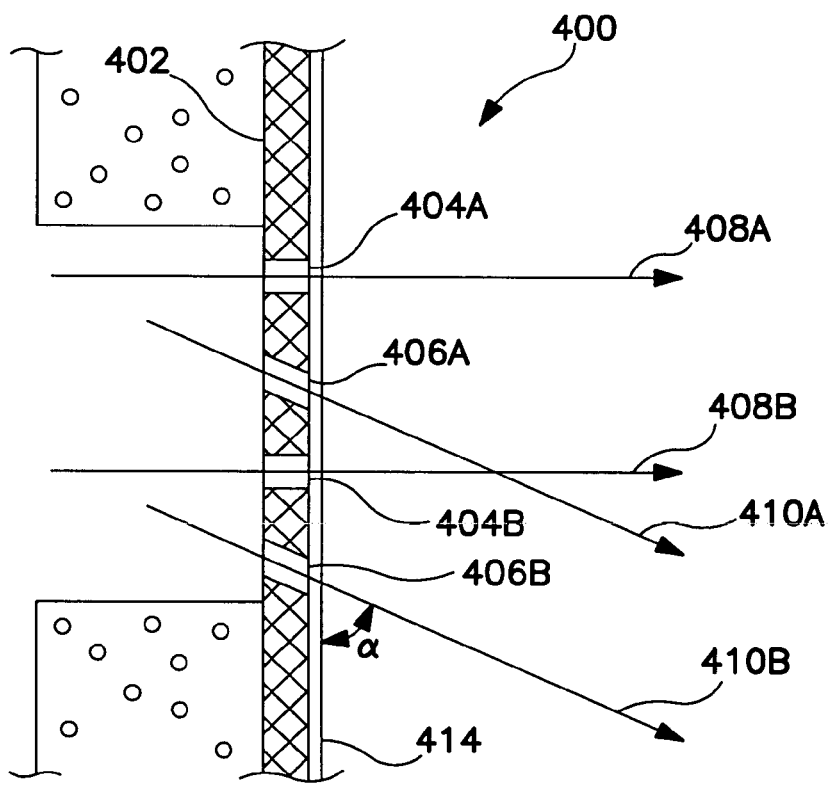
FIG. 3B is a profile view of a fourth embodiment backlit automotive trim panel in accordance with the present invention.

FIG. 3B shows light rays 408A and 408B emanating from a light source/s (not shown) through openings 404A and 404B and light rays 410A and 410B exiting through openings 406A and 406B in a cover layer 402. The openings 406A and 406B are formed in the cover layer at a second angle α to the front surface of the trim panel 400. An optional transparent or translucent layer 414 may also be applied over the opening 404A, 404B, 406A and 406B to prevent the openings from becoming clogged. The light rays travel in straight lines from the source through the openings. The second set of openings, formed at a different angle from the first set of openings, allow viewing of the light from a second angle. This could, e.g., provide visibility for a driver and a passenger or for both tall and short drivers.

Figure 4A:
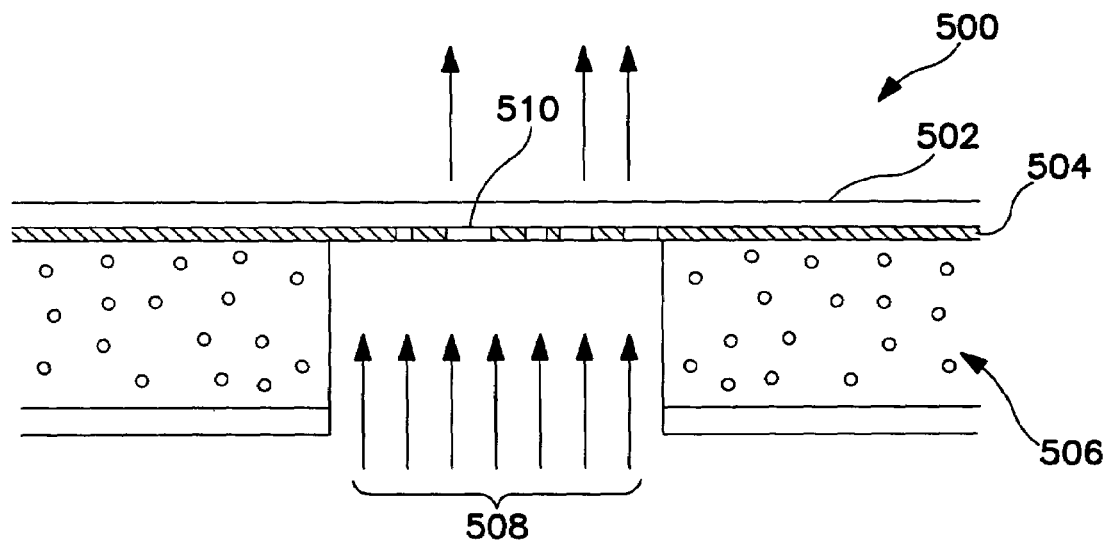
FIG. 4A is a profile view of a fifth embodiment backlit automotive trim panel in accordance with the present invention.

FIG. 4A shows an alternative method of illuminating a trim panel 500. In this embodiment there are no openings that extend through a front cover layer 502. The cover layer 502 maybe made of a transparent or translucent skin material. A coating, for example a paint layer 504, may be located between the cover layer 502 and a cushion or foam layer 506. The paint layer 504 can be applied over the entire surface of the cover layer 502 or only in sections. The paint can be removed in desired areas by masking and/or etching to allow light rays 508 from a light source (not shown) to travel through non-painted areas 510. Symbols or letters can be etched into the paint to display messages to vehicle occupants.

Figure 4B:
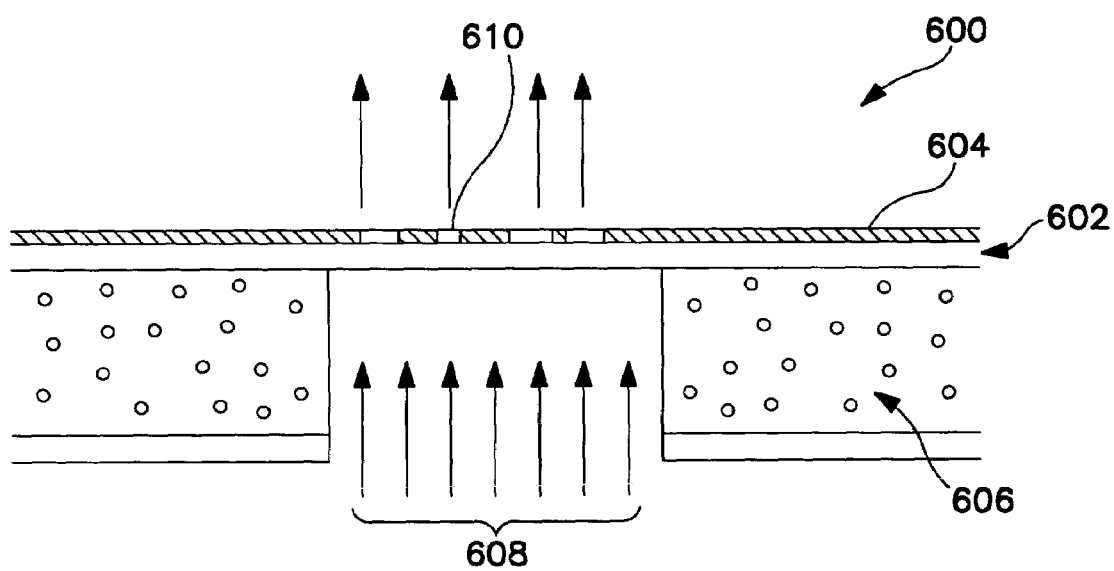
FIG. 4B is a profile view of a sixth embodiment backlit automotive trim panel in accordance with the present invention.

Alternatively, as shown in FIG. 4B, a paint layer 604 can be applied on the front surface of a cover layer 602 and allow light rays 608 from a light source (not shown) to travel through non-painted areas 610.

Figure 5:
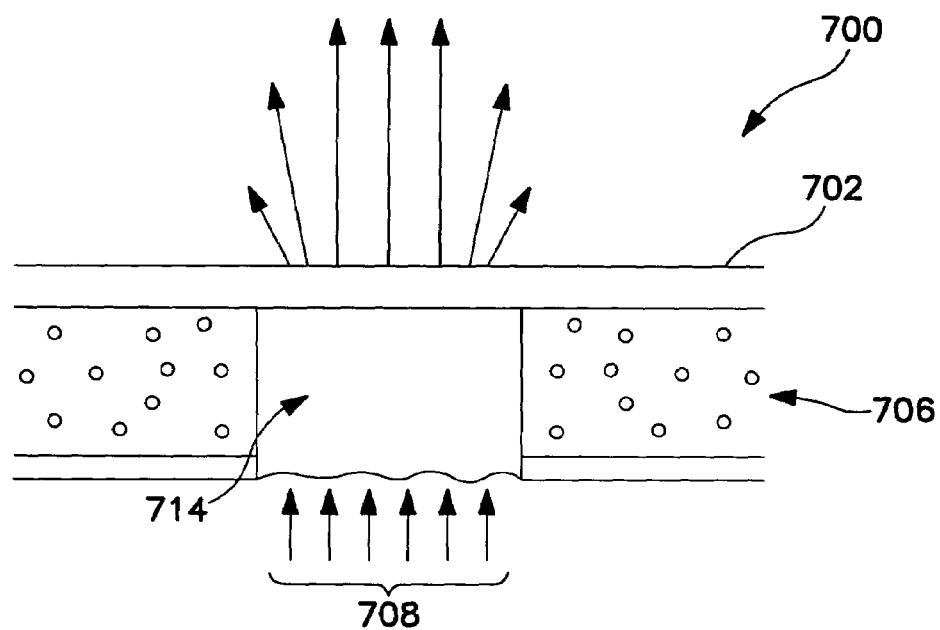
FIG. 5 is a profile view of a seventh embodiment backlit automotive trim panel in accordance with the present invention.

FIG. 5 shows an alternative method of illuminating a trim panel 700. In this embodiment there are no openings that extend through a front cover layer 702. The front cover layer 702 maybe made of a transparent or translucent skin material. A void 714 formed in a foam/cushion layer 706 maybe filled with a transparent or translucent material or gel, such as an acrylic gel derived from poly(methylmethacrylate) The transparent or translucent material could strengthen the cover layer 702 in the area of the void 714 and could further allow the opening to glow with light rays 708. The front cover layer 702 alternatively may have a substantially uniform thickness except in the area to be illuminated in which the cover layer is locally thinned down.

Figure 6:
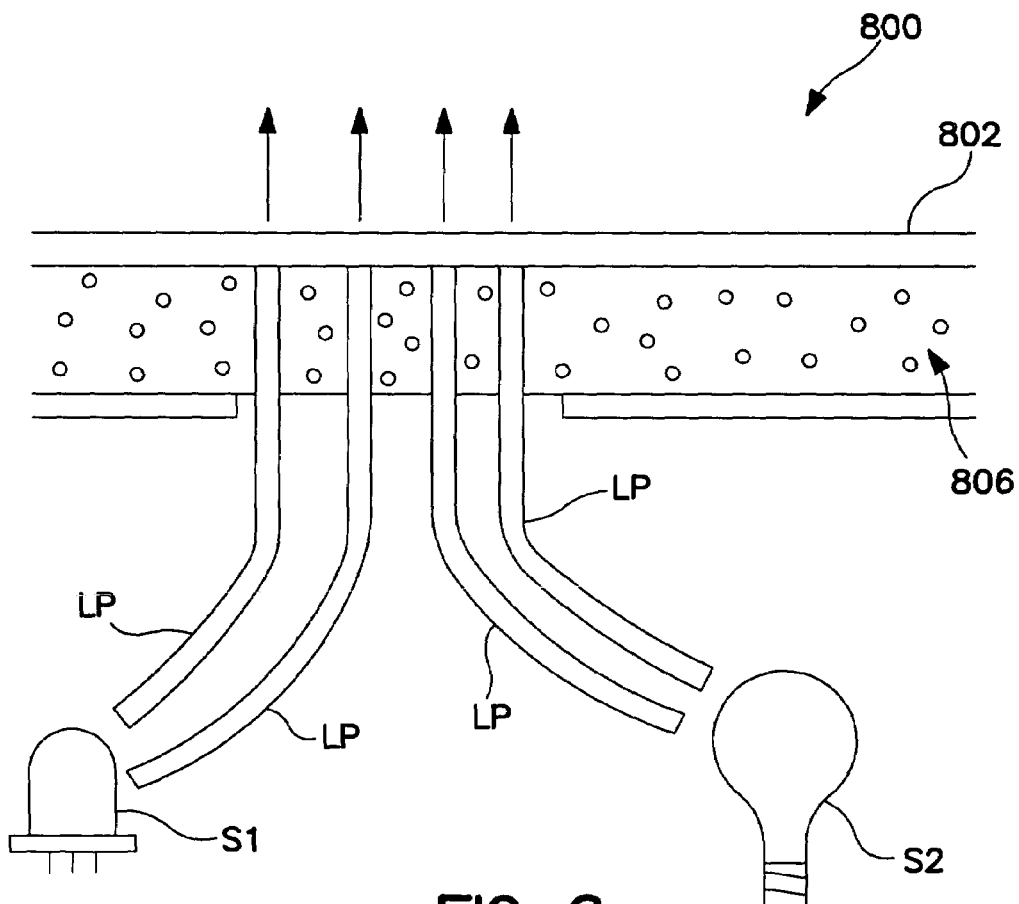
FIG. 6 is a profile view of an eighth embodiment backlit automotive trim panel in accordance with the present invention.
Figure 7A:
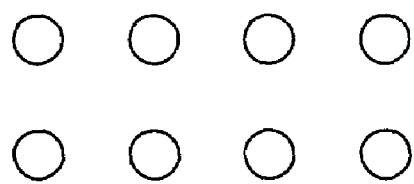
FIGS. 7A–G is a series of openings and opening patterns for use in conjunction with the present invention.
Figure 7B:
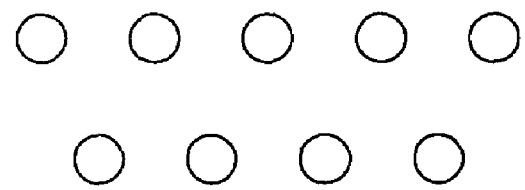
Figure 7C:
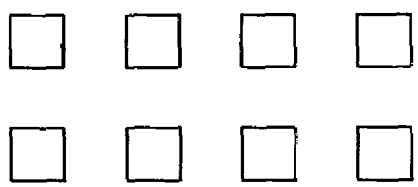
Figure 7D:
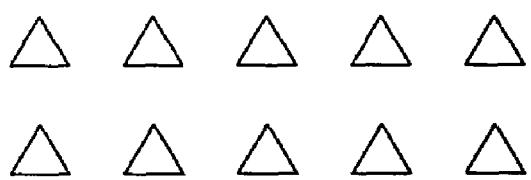
Figure 7E:
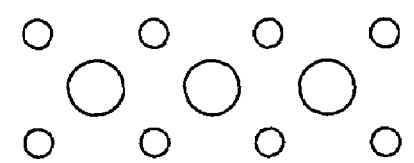
Figure 7F:
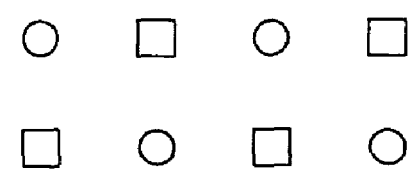
Figure 7G:
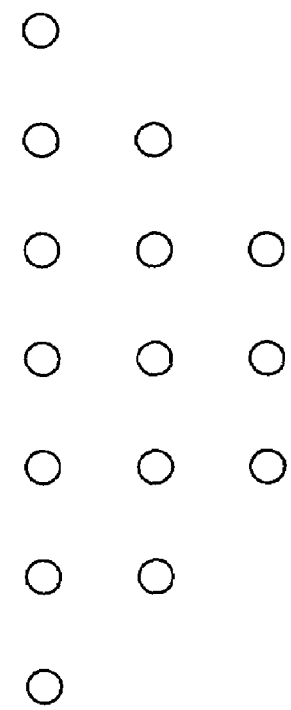

FIG. 6 shows an alternative embodiment of a trim panel 800. Trim panel 800 has a transparent or translucent cover layer 802 and a foam/cushion layer 806. A light pipe LP has a first and a second end, the first end adjacent the rear surface of the cover layer 802 and the second end adjacent a light source S1 or S2. The light pipe LP can be made from a fiber optic, acrylic polymer material such as poly(methylmethacrylate), or other suitable material. The light source can be a low temperature source such as an LED S1 or a higher temperature source such as an incandescent light source S2. Due to the elevated temperature of an incandescent light source S2, the source may need to be located in a remote location, or in a protective housing. Such a remote location may require to be serviceable and have an air space around the source to reduce the heat build-up and promote cooling. A plurality of light pipes can be also used to create a pattern. Light sources of different colors can be used to create patterns of different colors. The light pipes can be molded in place with the foam or cushion layer or inserted in openings formed through the foam/cushion layer with a laser or other cutter.

FIG. 7 shows a variety of opening shapes and patterns for use in the present invention. The opening can be arranged in aligned or offset rows as shown in FIGS. 7A and 7B. The openings can be circles, squares, triangles as shown in FIGS. 7A, 7C and 7D respectively or any other shape. The pattern of openings can be a combination of different sizes and shapes as shown in FIGS. 7E and 7F. The openings can be arranged to form large patterns as shown in FIG. 7G. The size, spacing, arrangement, rotation/orientation and combination of openings are selectable based on a desired result for an illumination pattern. The holes preferably should be small enough to allow for a dense pattern while not significantly weakening the cover layer. It has been discovered that the holes should be clear of ash or foreign matter that may interfere with light transmission. Hole sizes preferably between 0.0100 and 0.060" have been shown to optimize the back lighting effect disclosed herein, including all increments therebetween. However, other sizes are certainly suitable, provided the backlighting is still obtained.

In addition, the present invention herein also relates to the general construction shown in FIG. 1 as applied to, e.g., the headliner component of an automobile. An automobile "headliner" refers to the piece of material attached to the interior roof and side rear portions of an automobile. A headliner serves as a cosmetic to render the interior compartment of an automobile (or any other motor vehicle) aesthetically pleasing to the eye, as opposed to leaving the bare metal of the car's roof in full view. Typically, the headliner consists of a cloth, nylon or vinyl cover of pliable material that is secured by an adhesive to a cardboard liner. In some instances, a thin layer of foam is placed between the cardboard liner and the headliner sheet of material. In that regard many different types of laminates and laminated composites have also been tested and produced for use as an automobile headliner. Some headliners have a core of fiberglass fibers and a polyester resin. Others have been manufactured from a core of open cell polyurethane foam impregnated with a thermosetting resin, and with a reinforcing layer of fiberglass. Some headliners may even be manufactured of blow-molded polymer materials, such as polyolefine based materials, including polyethylene and/or polypropylene. In all cases, the invention herein therefore extends to a trim panel such as an automotive headliner, the headliner comprising a plurality of openings placed therein and a light source to light through said openings.

It should be understood that, while the present invention has been described in detail herein, the invention can be embodied otherwise without departing from the principles thereof, and such other embodiments are meant to come within the scope of the present invention as defined in the following claim(s)

The invention claimed is:

1. An automotive trim panel, comprising:
   a light transmissive cover layer having a front surface and a rear surface,
   a plurality of light pipes each having a first end and a second end, and a light source, wherein said first end of each of said light pipes is positioned adjacent to said rear surface of the cover layer and each of said second ends are positioned adjacent said light source wherein the cover layer further includes a foam layer, wherein said plurality of light pipes are molded in place with the foam layer wherein said foam layer extends between said light pipes and wherein the light pipes are a fiber optic.

2. The automotive trim panel of claim 1, wherein said plurality of light pipes are inserted in an opening formed in the foam layer by a laser.

3. The automotive trim panel of claim 1, wherein the cover layer is transparent.

4. The automotive trim panel of claim 1, wherein the plurality of light pipes are made of an acrylic polymer material.

5. The automotive trim panel of claim 1 wherein the light pipes are a fiber optic.

6. The automotive trim panel of claim 1, wherein the light source is a light emitting diode.

7. The automotive trim panel of claim 1, further comprising a colored filter in series with the light source to change the color of the exiting light.

8. A method of back lighting an automotive trim panel, comprising:
   forming a light transmissive cover layer having a front surface and rear surface,
   providing a plurality of light pipes each having a first end and a second end, and a light source, wherein said first end of each of said light pipes is positioned adjacent to said rear surface of the cover layer and said second end is positioned adjacent said light source wherein the cover layer further includes a foam layer, wherein the light pipes are molded in place with the foam layer wherein said foam layer extends between said light pipes.

9. The method of claim 8, wherein said cover layer has an elongation of 150%.

10. The method of claim 8, wherein said cover layer has a tensile strength of 5000 psi.

11. The method of claim 8 wherein said cover layer has a Shore Hardness between 60–100A.

* * * * *